United States Patent
Kashiwada et al.

(10) Patent No.: US 7,167,779 B2
(45) Date of Patent: Jan. 23, 2007

(54) DISPLAY METHOD AND APPARATUS FOR CHANGING DISPLAY POSITION BASED ON EXTERNAL ENVIRONMENT

(75) Inventors: Shinji Kashiwada, Kariya (JP); Koji Nakamura, Tokai (JP); Hiroshi Ando, Nagoya (JP); Takayuki Fujikawa, Okazaki (JP); Masaru Kakizaki, Nagoya (JP)

(73) Assignee: Denso Corporation, Kariya (JP)

( * ) Notice: Subject to any disclaimer, the term of this patent is extended or adjusted under 35 U.S.C. 154(b) by 281 days.

(21) Appl. No.: 10/779,657

(22) Filed: Feb. 18, 2004

(65) Prior Publication Data

US 2004/0193331 A1  Sep. 30, 2004

(30) Foreign Application Priority Data

Mar. 28, 2003  (JP) .............................. 2003-092335

(51) Int. Cl.
*G05D 1/00*   (2006.01)
*B06Q 1/00*   (2006.01)
*G09G 5/00*   (2006.01)

(52) U.S. Cl. .............................. 701/1; 340/435; 345/7

(58) Field of Classification Search ................ 345/7–9, 345/629–641, 419–428; 340/435–438; 701/1–18, 701/200–213

See application file for complete search history.

(56) References Cited

U.S. PATENT DOCUMENTS

| | | | |
|---|---|---|---|
| 6,559,813 B1* | 5/2003 | DeLuca et al. ................ 345/8 |
| 6,947,064 B1* | 9/2005 | Hahn et al. .................. 701/301 |
| 6,977,630 B1* | 12/2005 | Donath et al. ................. 345/7 |
| 2001/0040505 A1* | 11/2001 | Ishida et al. ................. 340/435 |
| 2004/0178894 A1* | 9/2004 | Janssen ....................... 340/435 |
| 2004/0183750 A1* | 9/2004 | Nagano et al. ................. 345/7 |
| 2005/0200700 A1* | 9/2005 | Schofield et al. ........... 348/148 |

FOREIGN PATENT DOCUMENTS

| | | |
|---|---|---|
| JP | A-8-197981 | 8/1996 |
| JP | B2-2913901 | 4/1999 |

* cited by examiner

*Primary Examiner*—Matthew Luu
(74) *Attorney, Agent, or Firm*—Posz Law Group, PLC

(57) ABSTRACT

In a head-up display device, when a preceding vehicle exists between a pre-movement information conveyor and a vehicle, the pre-movement information conveyor is moved to another position at which the pre-movement information conveyor is displayed as a recognizable post-movement information conveyor. Thus, the pre-movement information conveyor is removed from a state in which the pre-movement information conveyor is hidden behind the preceding vehicle, hence, becoming invisible. As a result, the incompatibility sense felt by the driver of the vehicle can be reduced and the information conveyor will be less overlooked.

6 Claims, 8 Drawing Sheets

DISPLAY METHOD AND APPARATUS FOR CHANGING DISPLAY POSITION BASED ON EXTERNAL ENVIRONMENT

CROSS REFERENCE TO RELATED APPLICATION

This application is based on and incorporates herein by reference Japanese Patent Application No. 2003-92335 filed on Mar. 28, 2003.

FIELD OF THE INVENTION

The present invention relates to a display method of presenting information to a driver of a vehicle and also relates to a display apparatus adopting the method.

BACKGROUND OF THE INVENTION

As a display method for presenting information to a driver of a vehicle, a variety of methods are proposed. One of the conventional methods is a head-up display (HUD). This HUD apparatus is characterized in that the HUD is capable of reducing the quantity of movement of the user's point of sight and, hence, useful for safety enhancement.

In order to improve the display visual recognizability of the HUD apparatus, a display apparatus disclosed in Japanese patent 2,913,901 has been proposed as a display apparatus utilizing a difference in vision between the eyes of the driver. According to this display apparatus, the difference in vision, amount and position of display data are varied in accordance with changes in vehicle traveling position to improve the perception ability of the driver and to enhance safety.

However, this display apparatus does not show a display according to the condition of the environment external to the vehicle. As a result, the ability of the display apparatus to present a visually recognizable display may deteriorate due to the condition of the external environment in some cases. When a guiding arrow leading ahead of the vehicle by a distance of 100 m is shown by using the difference in vision between the eyes of the driver as a three-dimensional display, it is likely that the driver hardly recognizes the guiding arrow leading ahead of the vehicle by a distance of 100 m because the driver pays attention to another vehicle leading ahead of this vehicle by a distance of 20 m.

SUMMARY OF THE INVENTION

It is thus an object of the present invention addressing the above problems to provide a display method adopted by a display apparatus mounted on a vehicle as a method of exhibiting a display according to an environment external to the vehicle in order to improve visual recognizability of the display and to provide the display apparatus.

In accordance with the present invention, the driver of a vehicle is allowed to three-dimensionally recognize the position of an information conveyor for conveying transformation to the driver by utilizing a difference in vision between the eyes of the driver. In particular, when an object exists between the position of existence of the information conveyor recognized by the driver and the vehicle, the position of existence is changed to the position of the object in advance and then the information conveyor is displayed.

Thus, the information conveyor, which is hidden behind the object and should be therefore invisible, is put in a state of being visible. As a result, the driver can feel the same sense as the normal sense of sight and the visual recognizability of the information conveyor is improved.

Alternatively, when an object exists between the position of existence of the information conveyor recognized by the driver and the vehicle, the position of existence is changed to a position other than a location behind the object in advance and then the information conveyor is displayed.

Further alternatively, when an object does not exist between the position of existence of the information conveyor recognized by the driver and a predetermined forward-direction distant position located further ahead of the position of existence, it is preferable to move the information conveyor in advance to the position of an object in a range determined by a distance between the predetermined forward-direction distant position and the driver with the driver taken as a reference point before displaying the information conveyor. By moving the information conveyor to a position in such a range, the distance between the position of existence of the information conveyor recognized by the driver and its background becomes equal so that the driver becomes capable of recognizing the information conveyor with ease.

Still further alternatively, when an object does not exist between the position of existence of the information conveyor recognized by the driver and a predetermined forward-direction distant position located further ahead of the position of existence, it is preferable to move the information conveyor in advance to the position of existence of an object existing in a distance generally equal to a distance between the position of existence of the information conveyor and the driver with the driver taken as a reference point before displaying the information conveyor. By moving the information conveyor to such a position, the distance between the position of existence of the information conveyor recognized by the driver and its background becomes equal. In addition, the distance between the position of existence of the information conveyor and the driver does not greatly change from the initial state so that the driver is capable or recognizing the information conveyor with ease.

In addition, the color tone distribution degree (or the component color dispersion degree) of the background at the position of existence of-the information conveyor is so high that the driver overlooks the information conveyor in some cases. For instance, the background is conceivably a signboard with a striking color, a traffic signal or the like.

In such cases, when the color tone distribution degree of a background at the position of existence of the information conveyor is higher than a predetermined reference, it is preferable to move the information conveyor in advance to a location having a color tone distribution degree lower than the predetermined reference before displaying the information conveyor. In addition, the information conveyor can also be moved in accordance with conditions such as the brightness and chroma of the background. It is also preferable to set the predetermined reference at a predetermined point of the color tone distribution degree. At the predetermined point of the color tone distribution degree, the rate of the information which the driver of the vehicle becomes difficult to recognize the information conveyor starts to increase. However, such a point of the color tone distribution degree varies from driver to driver. It is thus preferable to allow the predetermined reference to be set at an adjustable value.

By moving the information conveyor to such a location in such a way, the driver is capable of recognizing the information conveyor with ease even when the color tone distribution degree of a background at a planned display position is so high that the driver is hardly capable of recognizing the information conveyor. This is because the information conveyor is moved in advance to a location having a background with a low color tone distribution degree and displayed at the location.

In addition, before the position of existence of the information conveyor is changed to another position and the information conveyor is displayed at the other position, the information conveyor can also be once displayed at the position of existence before the position of existence is changed and, then, the position of existence of the information conveyor is changed to the other position before the information conveyor is displayed at the other position. It is to be noted that, as another alternative, the information conveyor can be displayed while the information conveyor is being moved.

By once displaying the information conveyor at the original intended visual recognition position, the driver can enjoy an effect of being able to grasp the visual recognition position with ease in the case of a special information conveyor such as an information conveyor exhibiting a positional characteristic. It is to be noted that, even after the original visual recognition position is changed to a new position, some indicators such as a drawing line can be used to show the original display position.

In addition, information on an environment external to the vehicle as well as information on the vehicle are acquired, and the driver of the vehicle is allowed to three-dimensionally recognize an information conveyor for conveying information to the driver by displaying the information conveyor through utilization of a difference in vision between the eyes of the driver. Furthermore, visual recognizability is evaluated on the basis of at least the information on an environment external to the vehicle and/or the information on the vehicle, whereas at least one of a position, shape and color of the information conveyor recognized by the driver is changed from a predetermined state to a state of improved visual recognizability before the information conveyor is displayed.

It is to be noted that the above predetermined state means a state other than a state determined by an environment external to the vehicle. An example of the predetermined state is a state displayed in a predetermined shape and a predetermined color at a predetermined location. The above information on the vehicle is typically information on the present position and movement direction of the vehicle.

In a display apparatus provided with the configuration described above, even a state in which the driver is hardly capable of visually recognizing the information conveyor due to, among other reasons, an environment external to the vehicle is changed to a state allowing the driver to recognize the information conveyor with ease before the information conveyor is displayed on a display device. As a result, information can be presented to the driver correctly.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENT

Figure 1:
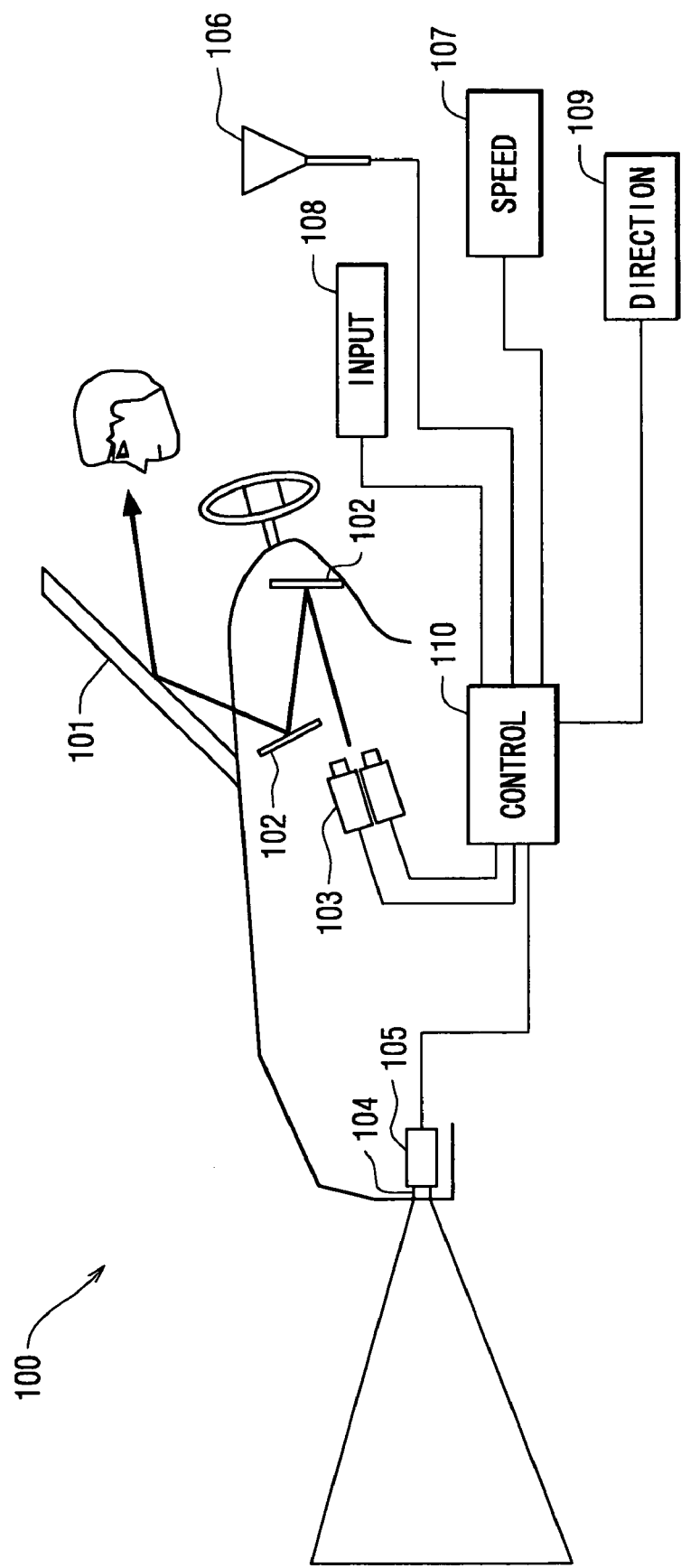
FIG. 1 is a schematic diagram showing a navigation system implemented by an embodiment of the present invention.

Referring first to FIG. 1, a navigation system 100 comprises a windshield 101, mirrors 102, two display units 103, a CCD camera 104, a laser radar 105, a GPS antenna 106, a vehicle speed sensor 107, information input switches 108, a direction sensor 109 and a control unit 110.

The windshield 101 is a vehicle front side window. The windshield 101 is surface-processed on its interior surface which is on the driver compartment side so that it operates as a combiner. The mirrors 102 are reflection mirrors for leading light beams output from the display units 103 to the windshield 101. The display units 103 are provided respectively for the left and right eyes of a driver. Light beams output by the display unit 103 are led by the mirrors 102 and the windshield 101 to arrive at the left and right eyes of the driver.

The CCD camera 104 is an optical camera for taking a picture of a front view in front of the vehicle. The CCD camera 104 is capable of outputting a picture image as an electrical signal. The laser radar 105 is a component for radiating a laser to a front target in order to measure the distance between the vehicle and the target. The laser radar 105 is capable of outputting a result of distance measurement as an electrical signal.

The GPS antenna 106 is an antenna for receiving signals from GPS (Global Positioning System) satellites. The GPS antenna 106 is capable of outputting the received signals as electrical signals.

The vehicle speed sensor 107 is a sensor for generating a signal representing the speed of the vehicle on which the navigation system 100 is mounted. The information input switches 108 are switches operated by the driver to enter various information for changing the operation of the navigation system 100. The direction sensor 109 is typically a geomagnetism sensor or a gyroscope. The direction sensor 109 is capable of generating electrical signals representing quantities such as a direction and acceleration of the vehicle.

The control unit 110 is a component for receiving signals from the CCD camera 104, the laser radar 105, the GPS antenna 106, the vehicle speed sensor 107, the information input switches 108 and the direction sensor 109 and for controlling the display units 103 on the basis of the signals.

Figure 2:
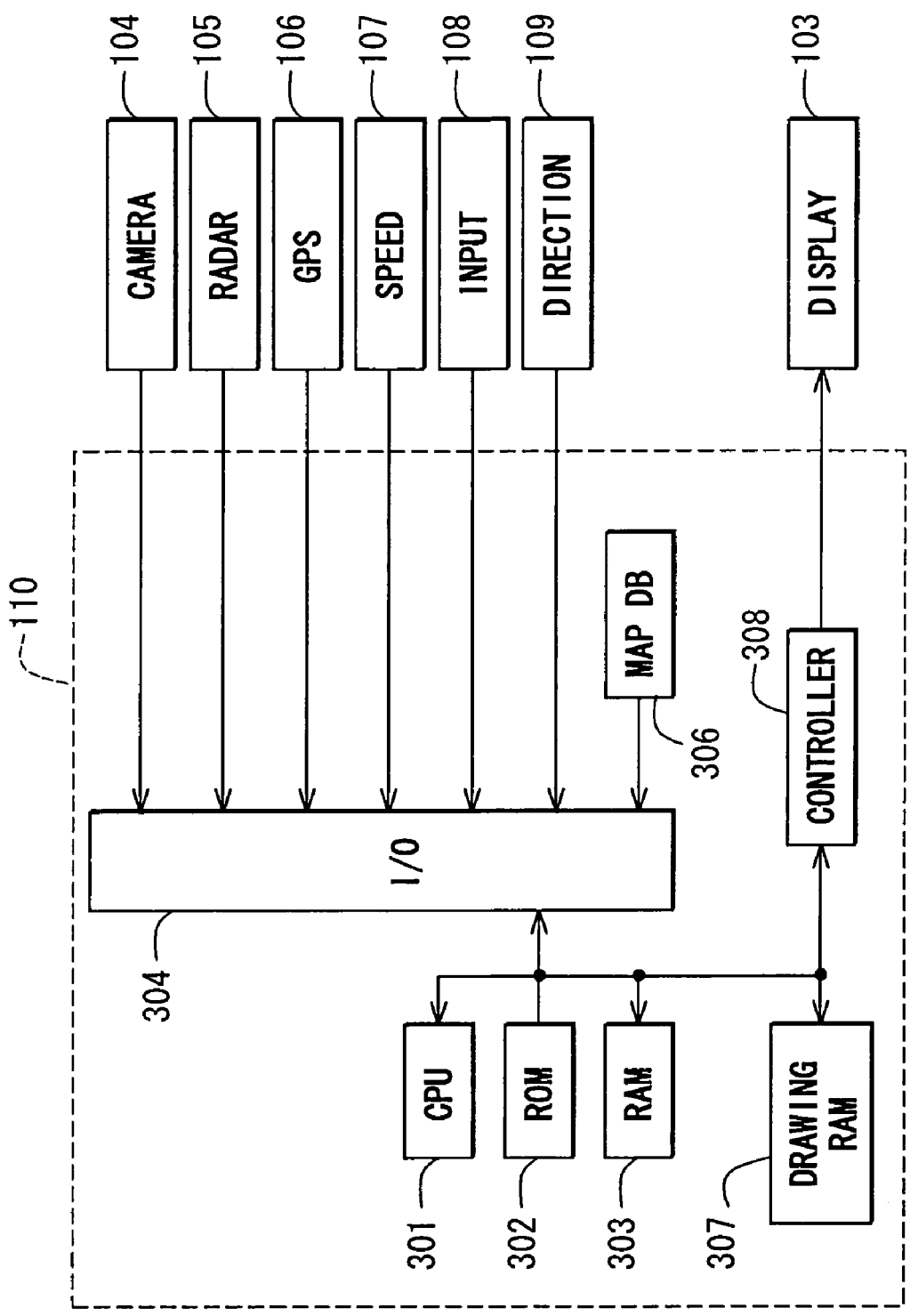
FIG. 2 is a block diagram showing a control unit of the navigation system.

Next, the control unit 110 is described in detail by referring to a block diagram of FIG. 2. The control unit 110 comprises a CPU 301, a ROM 302, a RAM 303, an input/output unit 304, a map database (DB) 306, a drawing RAM 307 and a display controller 308.

The CPU 301 is a generally known processor, whereas the ROM 302, the RAM 303 and the drawing RAM 307 are each a commonly known memory module. The CPU 301 uses the RAM 303 as a temporary storage area in carrying out various kinds of processing by execution of programs stored in the ROM 302, and stores picture data in the drawing RAM 307.

The input/output unit 304 is an interface for receiving signals from the CCD camera 104, the laser radar 105, the GPS antenna 106, the vehicle speed sensor 107, the information input switches 108, the direction sensor 109 as well as the map DB 306 and passing on the signals to the CPU 301, the RAM 303, the drawing RAM 307 and the display controller 308.

The map DB 306 is a medium for storing map data such as road-shape data, road-width data, road-type data, road numbers, road-traffic regulation data, topographical data, mark data, intersection data and facility data. Taking the amount of data to be stored in the medium into consideration, a storage apparatus having a large storage capacity is generally used as the medium. Examples of the storage apparatus having a large storage capacity are a DVD-ROM and a hard disk. However, a medium usually having a smaller storage capacity, such as a memory card, can also be used.

The display controller 308 is a component for reading out picture data stored in the drawing RAM 307, carries out calculation to display an information conveyor at a proper position and issues a command to the display units 103.

Figure 3:
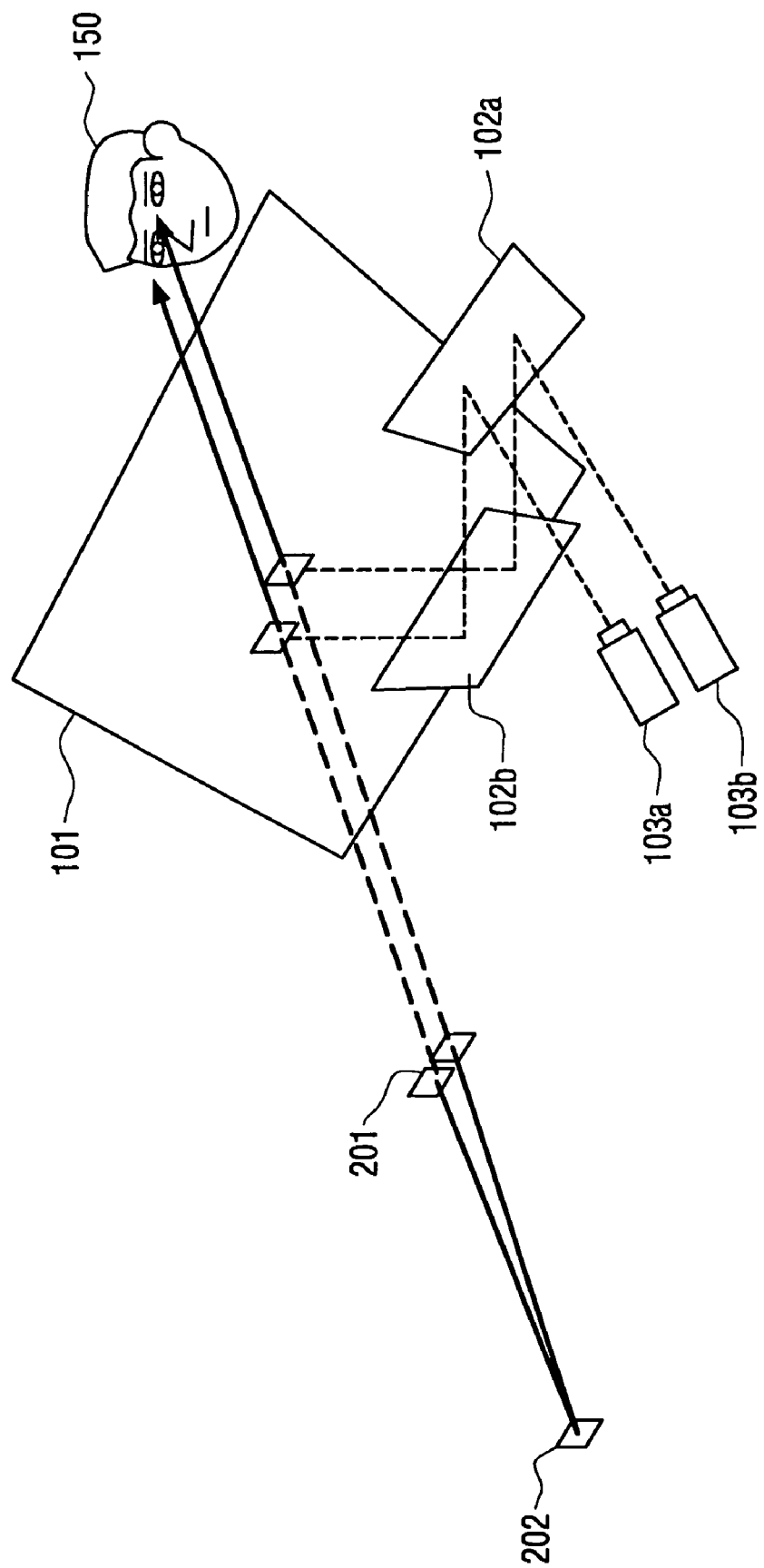
FIG. 3 is a schematic diagram showing a perspective view.

Next, a three-dimensional visual field of the navigation system 100 is described by referring to a conceptual drawing of FIG. 3. A light beam output from the display unit 103a for the right eye of the driver arrives at the right eye of the driver by way of the mirror 102a, the mirror 102b and the windshield 101. On the other hand, a light beam output from the display unit 103b for the left eye of the driver arrives at the left eye of the driver by way of the mirror 102a, the mirror 102b and the windshield 101.

As shown in FIG. 3, image-formation positions 201 exist on both sides of the windshield 101, that is, the driver side and the side opposite to the driver side with respect to the windshield 101, sandwiching the windshield 101. Each of the image-formation positions is separated away from the windshield 101 by a distance equal to the total length of optical paths traveled by the light beams from the display units 103a and 103b to the windshield 101. As shown in FIG. 3, a visual recognition position 202 of a three-dimensional display visually recognized by a driver 150 is an intersection of an extension of a line drawn from the right eye of the driver 150 to an image formed at the image-formation position 201 on the side opposite to the driver side as an image for the right eye and an extension of a line drawn from the left eye of the driver to an image created at the image-formation position 201 on the side opposite to the driver side as an image for the left eye.

The CCD camera 104 and the laser radar 105 operate as an external information acquisition means. The GPS antenna 106, the vehicle speed sensor 107 and the direction sensor 109 operate as a vehicle information acquisition means. The display units 103, the mirrors 102 and the windshield 101 operate as a display means. The CPU 301 and the display controller 308, which are included in the control unit 110, operate as a control means.

Next, the processing carried out by the CPU 301 employed in the control unit 110 is described. The CPU 301 carries out a route setting process and a route guiding process, which are normally performed by the conventional navigation system. In addition, the CPU 301 also carries out a display process and a setting process as processing peculiar to the navigation system 100 implemented by this embodiment.

(1) Display Process

Figure 4:
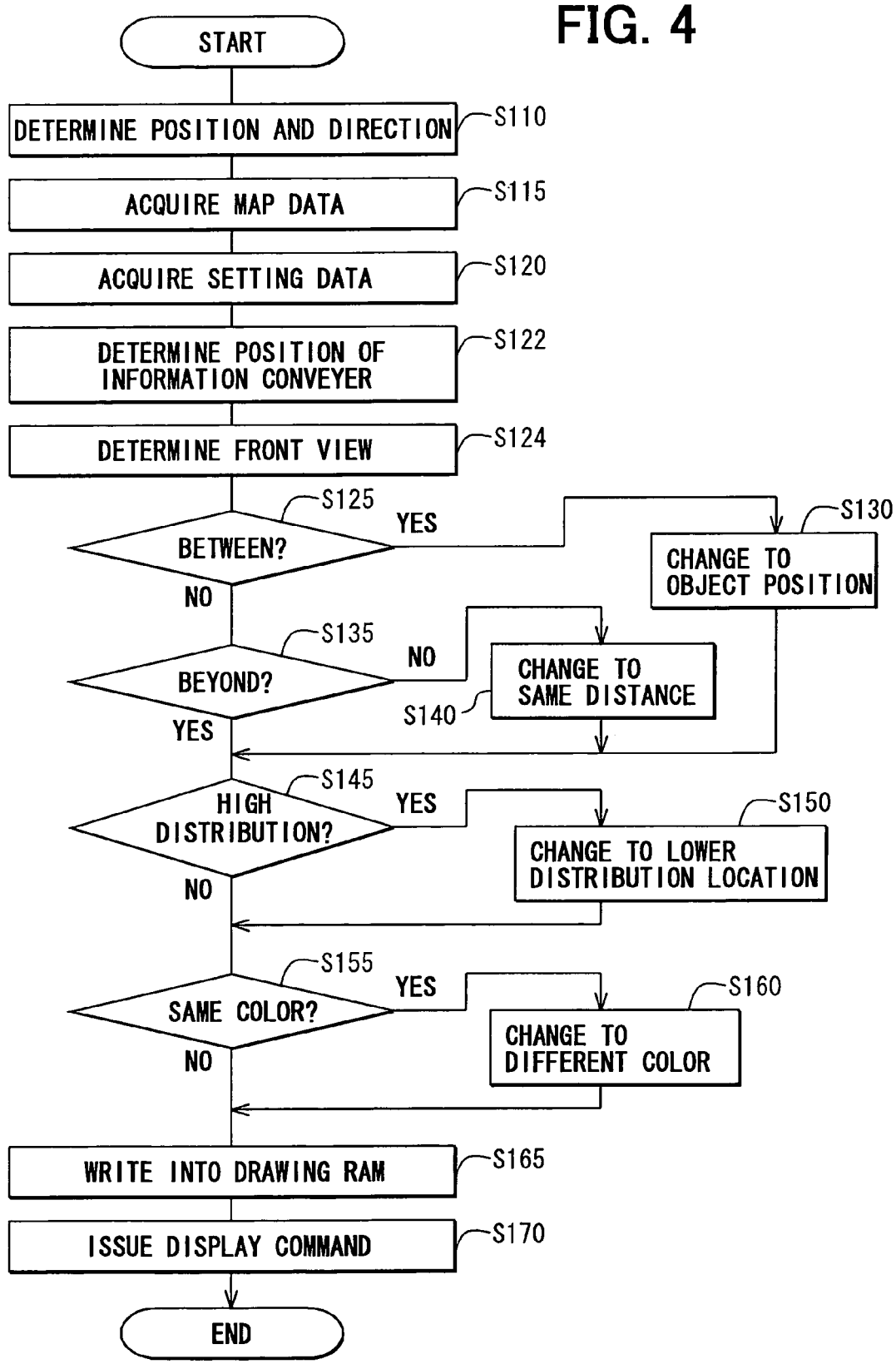
FIG. 4 is a flowchart showing a display process attained by the control unit.

FIG. 4 shows a flowchart of the display process executed by the control unit 110. The display process is carried out repeatedly when an ignition key of the vehicle is turned on and information to be displayed exists.

The flowchart begins with a step S110 at which the position and direction of the vehicle are determined. The position and direction of the vehicle can be found on the basis of signals generated by the GPS antenna 106, the vehicle speed sensor 107 and the direction sensor 109.

Then, at the next step S115, map data for the vicinity of the present position found at the step S110 is acquired from the map DB 306. Subsequently, at the next step S120, display setting data already set in a setting process to be described later is acquired from the RAM 303. The display setting data is data representing the shape, color and display position of an information conveyor.

The information conveyor means a displayed object for informing the driver of information. Examples of the information conveyor are a guiding arrow, an image for communicating the condition of a road and characters directly describing information. It is to be noted that, when the display setting data has not been set, default display setting data is used.

Then, at the next step S122, a planned display position of the information conveyor is determined on the basis of the position and direction found at the step S110 as of the position and direction of the vehicle as well as map data acquired at the step S115.

Subsequently, at the next step S124, the condition of a view in front of the vehicle is identified on the basis of signals generated by the CCD camera 104 and the laser radar 105. In this case, identification of a condition means an operation to grasp information on the condition. Examples of the information on the condition are the position and shape of a preceding vehicle, the position and shape of a roadside and a scenery seen by the driver.

Then, the process proceeds to the next step S125 to select a step following the step S125 by determining whether or not some objects exist between this vehicle and the visual recognition position. When an object exists between this vehicle and the visual recognition position, the process proceeds to a step S130. When an object does not exist between this vehicle and the visual recognition position, on the other hand, the process proceeds to a step S135.

At the step S130, the visual recognition position of the information conveyor is changed or moved to the position of the existing object. The movement of the visual recognition position merely results in a change in data. An actual display has not been shown yet. The object's surface on the vehicle side is a desirable position to which the post-movement position is changed. After the operation to change the visual recognition position of the information conveyor is completed, the process proceeds to the next step S145.

It is to be noted that, when the display position of the information conveyor in the display setting data acquired at the step S120 specifies a location other than 'Auto', the information conveyor is displayed at the specified location without changing the visual recognition position of the information conveyor. This operation to display the information conveyor at the specified location other than 'Auto' applies to all movements described in the following description.

Figure 5:
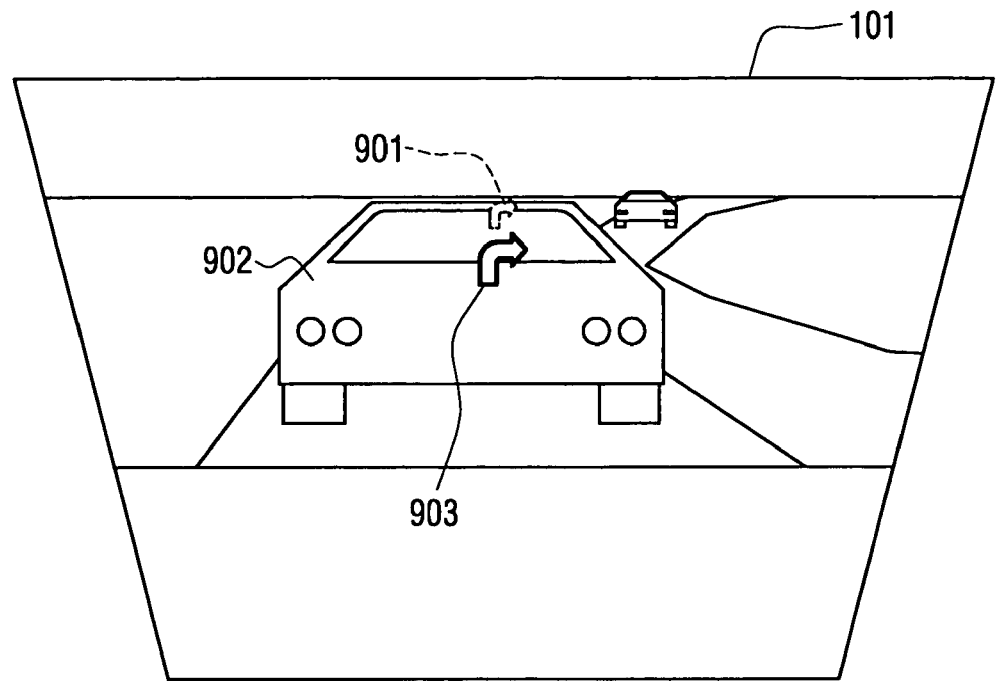
FIG. 5 is a schematic diagram showing a typical movement of an information conveyor.

An example of the processing carried out at the step S130 is described by referring to an image shown in FIG. 5. This image is a view, which is visible when the driver in the vehicle sees what exists in front of the vehicle through the windshield 101. A pre-movement information conveyor 901 is leading ahead of (beyond) a preceding vehicle 902 in a positional relation putting the pre-movement information conveyor 901 in a naturally concealed state. When the pre-movement information conveyor 901 is deliberately displayed in this state, the pre-movement information conveyor 901 is put in a visible state in spite of the fact that the pre-movement information conveyor 901 is naturally hidden behind the preceding vehicle 902, being put in an invisible state (beyond the vehicle). With the pre-movement information conveyor 901 deliberately displayed, a sense different from the normal sense of perception is brought about to the driver. It is thus likely that the driver is hardly capable of recognizing the information conveyor.

In order to solve this problem, the information conveyor is moved to the position of the preceding vehicle 902 as indicated by a post-movement information conveyor 903. By displaying the post-movement information conveyor 903 in this way, the incompatibility sense felt by the driver can be reduced and the information conveyor can thus be recognized with ease.

Referring back to FIG. 4, at the step S135, a step following the step S135 is selected by determining whether or not an object exists within a predetermined forward-direction distance (beyond) starting from the present position of the information conveyor in the movement direction of the vehicle. In this case, it is preferable to take a distance of several tens of meters as a typical predetermined forward-direction distance. An ordinary driver is capable of easily recognizing an object existing within such a predetermined forward-direction distance. When an object exists within a predetermined forward-direction distance, the process proceeds to a step S145. When an object does not exist within a predetermined forward-direction distance, on the other hand, the process proceeds to a step S140.

At the step S140, the visual recognition position of the information conveyor is changed to the position of an object existing at a location of about the same distance from this vehicle as the distance of an already existing object. After the operation to change the visual recognition position of the information conveyor to the position of such an object is completed, the process proceeds to the step S145.

Figure 6:
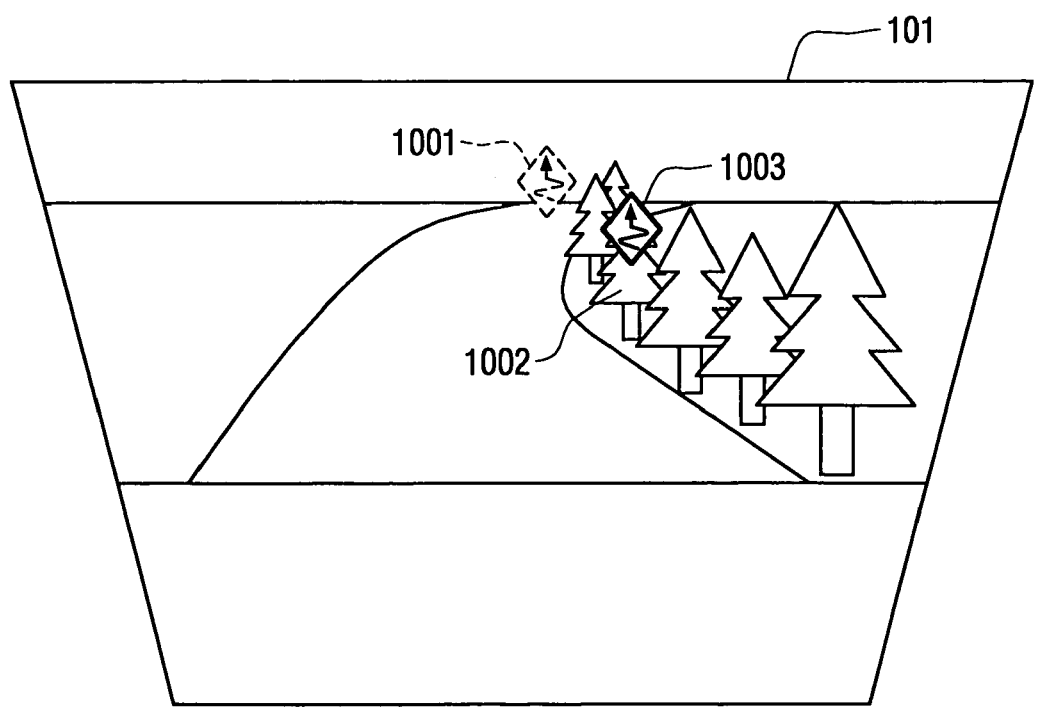
FIG. 6 is a schematic diagram showing another typical movement of the information conveyor.

An example of the processing carried out at the step S140 is described by referring to an image shown in FIG. 6. This image is a view, which is visible when the driver in the vehicle sees what exists in front of the vehicle through the windshield 101. A pre-movement information conveyor 1001 is a road sign showing that the road lying ahead of the vehicle is a winding road. The pre-movement information conveyor 1001 is positioned in the air space above the start of the winding road. When the background of the pre-movement information conveyor 1001 is the air, the pre-movement information conveyor 1001 is put in a state of floating in a space spreading afar. When the information conveyor 1001 is displayed in the air space above the start of the winding road, it is likely that the driver is not capable of immediately recognizing the information conveyor 1001. This is because there is actually a great difference in position of existence between the air and the information conveyor 1001.

In order to solve this problem, the visual recognition position of the information conveyor 1001 is changed to the position of a standing tree 1002 existing in the vicinity of the start of the winding road as indicated by a post-movement information conveyor 1003. By changing the visual recognition position of the information conveyor 1001 to such a location, the information conveyor and its vicinity background, which exist at about the same positions, can be seen. As a result, the driver is capable of recognizing the information conveyor 1003 with ease.

Refer back to FIG. 4. At the step S145, the color tone distribution degree (or the component color dispersion degree) of the background at the position of existence of the information conveyor is examined to determine whether or not the color tone distribution degree is higher than a predetermined reference. It is preferable to set the predetermined reference at a predetermined point of the color tone distribution degree. At this predetermined point of the color tone distribution degree, the rate of the information conveyor's becoming hardly recognizable by the driver of the vehicle starts increasing. However, such a point of the color tone distribution degree varies from driver to driver. It is thus preferable to allow the predetermined reference to be set at an adjustable value. When the color tone distribution degree is higher than the predetermined reference, the process proceeds to a step S150. When the color tone distribution degree is lower than the predetermined reference, on the other hand, the process proceeds to a step S155.

At the step S150, the visual recognition position of the information conveyor is changed to a location at which the color tone distribution degree of the background is low. After the operation to change visual recognition position of the information conveyor to such a location is completed, the process proceeds to the step S155.

Figure 7:
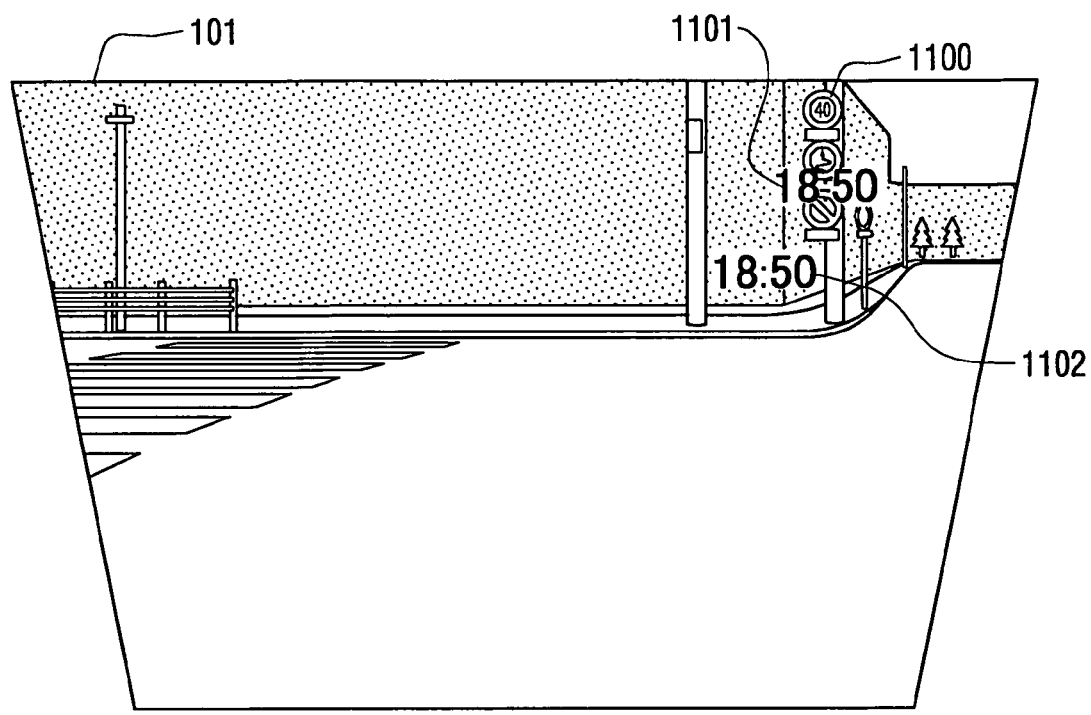
FIG. 7 is a schematic diagram showing a further typical movement of the information conveyor.

An example of the processing carried out at the step S150 is described by referring to an image shown in FIG. 7. This image is a view, which is visible when the driver in the vehicle sees what exists in front of the vehicle through the windshield 101. A pre-movement information conveyor 1101 is an information conveyor showing a time of the day at the upper right corner of a view in front of the vehicle. On the background of the pre-movement information conveyor 1101, a road sign 1100 is seen. Due to an effect of a striking color, in which the road sign 1100 normally displayed, the driver is hardly capable of recognizing the information conveyor 1101 in some cases.

As shown by a post-movement information conveyor 1102, the information conveyor is moved to a position overlapping a concrete block having a constant color tone. By placing the information conveyor 1102 at such a position, the driver becomes capable of recognizing the information conveyor 1102 with ease.

Referring back to FIG. 4, at the step S155, the background of the visual recognition position of the information conveyor is examined to determine whether or not the background has the same color system as the information conveyor. When the background has the same color system as the information conveyor, the process proceeds to a step S160. When the background does not have the same color system as the information conveyor, on the other hand, the process proceeds to a step S165.

At the step S160, the color of the information conveyor is changed to a color different from the color of the background. For example, the color of the information conveyor may be changed to a color which is the complementary color of that of the background. After the color of the information conveyor is changed to the color different from the color of the background, the process proceeds to the step S165.

Figure 8:
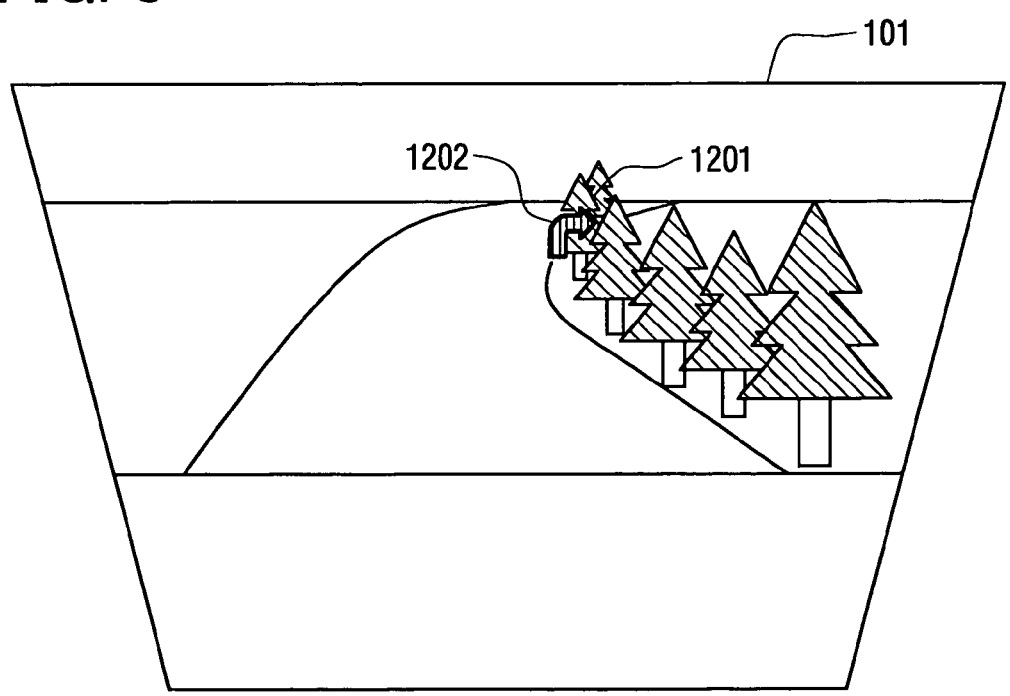
FIG. 8 is a schematic diagram showing a still further typical movement of the information conveyor.

An example of the processing carried out at the step S160 is described by referring to an image shown in FIG. 8. This image is a view, which is visible when the driver in the vehicle sees what exists in front of the vehicle through the windshield 101. An information conveyor 1202 indicates that a road following the information conveyor 1202 curves to the right. The information conveyor 1202 is placed on a roadside at the beginning of the curving road. When the information conveyor is displayed in a green color similar to the green color of a standing tree 1201 existing on the background of the information conveyor as is the case with the information conveyor 1202, it is likely that the driver has a difficulty in distinguishing the information conveyor 1202 from the background and, hence, recognizing the information conveyor 1202.

In order to solve this problem, the display color of the information conveyor 1202 is changed from green to red. By changing the display color of the information conveyor 1202 from green to red, it becomes easy for the driver to distinguish the information conveyor 1202 from the standing tree 1201 and, hence, recognize the information conveyor 1202. Of course, the green display color of the information conveyor 1202 can also be erased to make the information conveyor 1202 easy to recognize visually.

Refer back to FIG. 4. At the step S165, the information conveyor is written into the drawing RAM 307. Then, at the next step S170, a display command is issued to the display controller 308 to end the execution of this display process.

Receiving the display command, the display controller 308 reads out drawing data of the information conveyor from the drawing RAM 307, computes a proper difference in vision and outputs light beams for displaying the information conveyor to the display units 103.

(2) Setting Process

Figure 9:
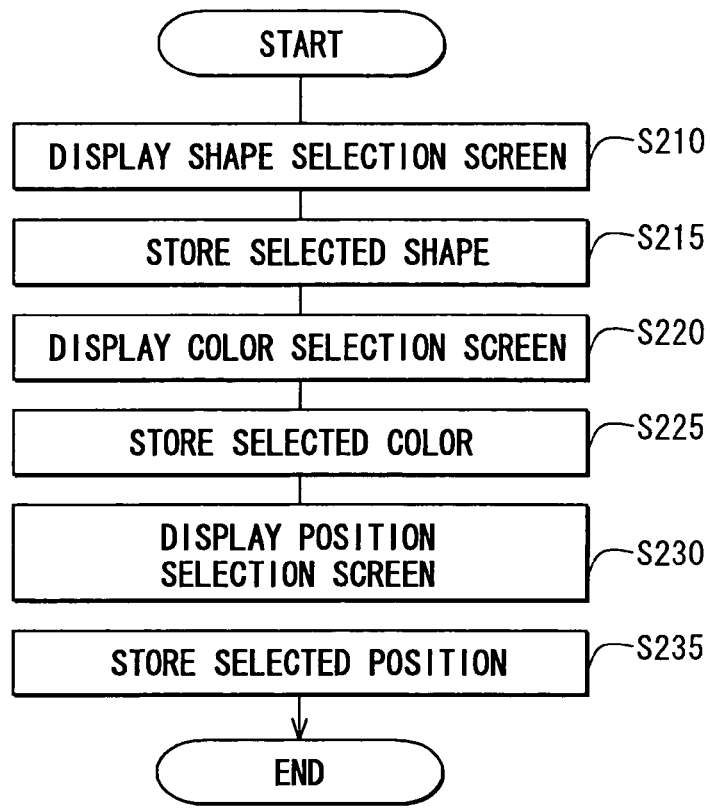
FIG. 9 is a flowchart showing a setting process attained by the control unit.

FIG. 9 shows a flowchart of the setting process. The setting process is started when a driver operates the information input switches 108 to enter a command for carrying out the setting process.

Figure 10:
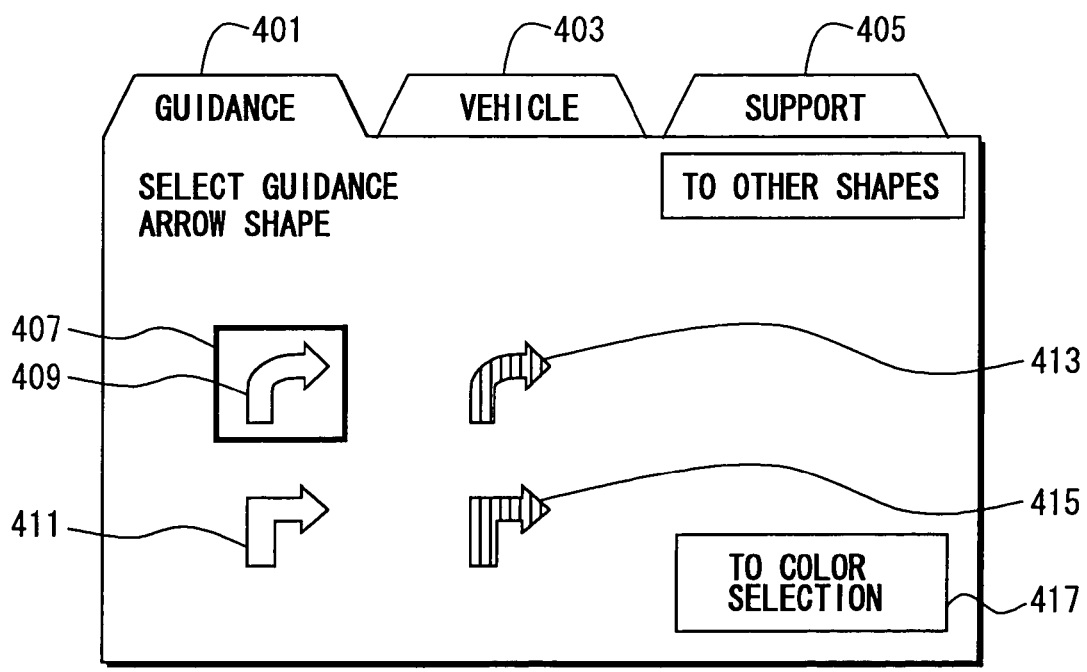
FIG. 10 is a diagram showing a typical setting screen displayed in the setting process.

The flowchart begins with a step S210 at which a screen for selecting a shape of the information conveyor is displayed on the windshield 101. An example of such a screen is described by referring to FIG. 10 showing a setting screen. The setting screen has a guidance information tab 401, a vehicle information tab 403 and an operation support information tab 405. A screen of the guidance information tab 401 shows 4 typical shapes 409, 411, 413 and 415 of the guidance arrow. Assume that the driver operates the information input switches 108 to move a cursor 407 to a specific one of the 4 typical shapes in order to select the specific shape. When the driver presses a button 417 displayed on the screen as a button marked with a phrase stating "TO COLOR SELECTION" after selecting the specific shape, the selected specific shape is confirmed as the shape of the guidance arrow and the screen is replaced with a screen for selecting a color of the guidance arrow as will be described below.

Refer back to FIG. 9. At the next step S215, the shape selected at the step S210 as the shape of the information conveyor is stored in the RAM 303.

Figure 11:
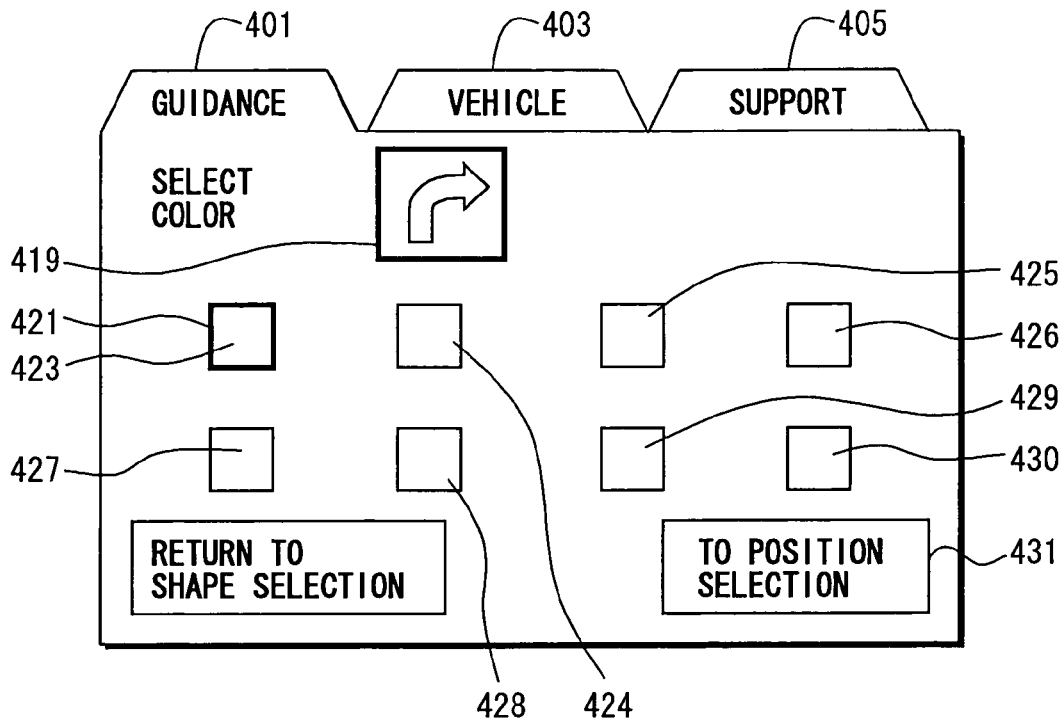
FIG. 11 is a diagram showing another typical setting screen displayed in the setting process.

Then, at the next step S220, the screen for selecting a color of the information conveyor is displayed on the windshield 101. An example of such a screen is described by referring to FIG. 11 showing a setting screen. A screen of the guidance information tab 401 shows rectangular color samples 423 to 430 representing a variety of colors. Assume that the driver operates the information input switches 108 to move a cursor 421 to a specific one of the rectangular color samples 423 to 430 in order to select the specific color sample. When the driver presses a button 431 displayed on the screen as a button marked with a phrase stating "TO POSITION SELECTION" after selecting the specific color sample, the selected specific color is confirmed as the color of the guidance arrow and the screen is replaced with a screen for selecting a display position of the guidance arrow as will be described below. It is to be noted that a display sample 419 appears at the uppermost position of the guidance information tab 401. The display sample 419 is the guidance arrow with the shape selected previously and the color selected by using this screen, allowing the driver to verify what has been selected in a real-time manner.

Referring back to FIG. 9, at the next step S225, the color selected at the step S220 as the color of the information conveyor is stored in the RAM 303.

Figure 12:
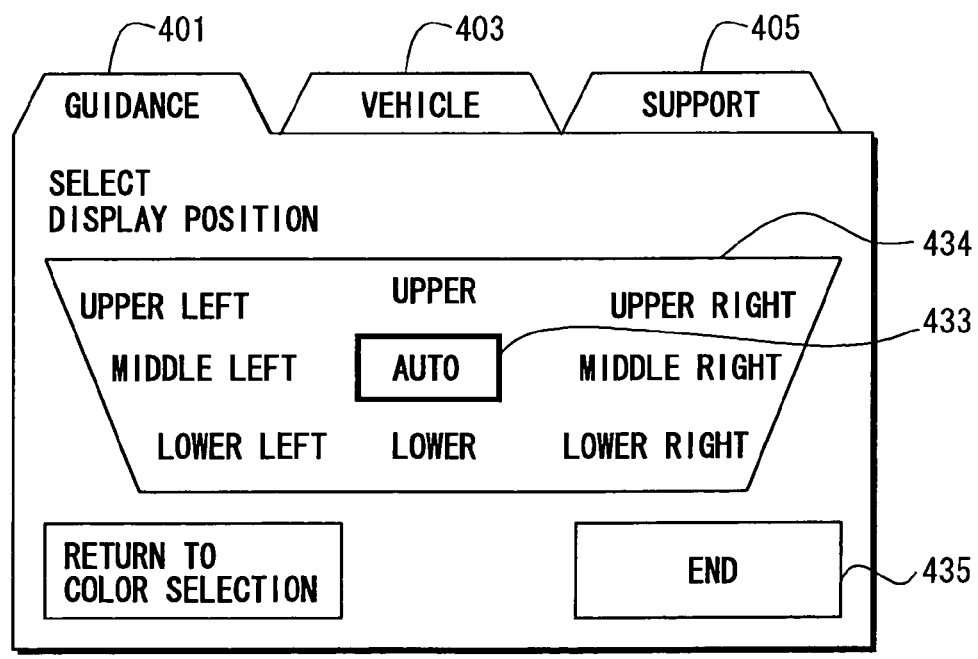
FIG. 12 is a diagram showing a further typical setting screen displayed in the setting process.

Then, at the next step S230, the screen for selecting a display position of the information conveyor is displayed on the windshield 101. An example of such a screen is described by referring to FIG. 12 showing a setting screen. In a frame 434 appearing on the guidance information tab 401 as a frame serving as a model of the windshield 101, nine alternatives of the display position of the information conveyor are arranged. The alternatives are 'UPPER LEFT', 'UPPER', 'UPPER RIGHT', 'MIDDLE LEFT', 'AUTO', 'MIDDLE RIGHT', 'LOWER LEFT', 'LOWER' and 'LOWER RIGHT'. The driver can operate the information input switches 108 to move a cursor 433 to a specific one of the alternatives in order to select a display position indicated by the selected alternative.

When the 'AUTO' alternative is selected, a display position obtained as a result of changing the visual recognition position in the display process described earlier is taken as the display position of the information conveyor. When an alternative other than the 'AUTO' alternative is selected, on the other hand, the display position indicated by the selected alternative takes precedence of a display position obtained as a result of changing the visual recognition position in the display process described earlier. When the driver presses a button 435 displayed on the screen as a button marked with the word "END" after selecting the specific alternative, the selected specific alternative is confirmed as the display position of the guidance arrow and the screen disappears.

Referring back to FIG. 9, at the next step S235, the display position selected at the step S230 as the display position of the information conveyor is stored in the RAM 303 and execution of this setting process is ended.

Since the driver can set the shape, color and display position of the information conveyor as described above, the attributes of the information conveyor can be changed in accordance with some factors such as differences in power of recognizing the information conveyor among individuals and favorites of the individuals. As a result, the visual recognizability of the information conveyor can be improved and the information conveyor can thus be used with a higher degree of convenience.

The above embodiment may be modified as follows.

(a) In the embodiment described above, when an object exists between the visual recognition position and this vehicle, the visual recognition position is changed to the position of the object. However, the visual recognition position can be changed to any new position as long as the new position is not hidden or not behind the object from the vehicle compartment. Even by changing the visual recognition position to such a new position, the incompatibility sense felt by the driver can be eliminated. As a result, the visual recognizability of the information conveyor can be improved.

(b) Instead of carrying out the processing of the step S140 of the flowchart shown in FIG. 4 for a case in which an object does not exist between the visual recognition position and this vehicle in accordance with the embodiment described above, the information conveyor can be displayed at a display position changed to the position of an object existing in a range determined by a distance between a predetermined forward-direction position and this vehicle with the driver taken as a reference point. Even by changing the visual recognition position to a position in such a range, the distance between the position of existence of the information conveyor recognized by the driver and its background is correct so that the driver is capable or recognizing the information conveyor with ease.

(c) In the embodiment described above, when the driver is expected to have difficulties in visually recognizing the information conveyor, the visual recognition position of the information conveyor is changed to another position instead of displaying the information conveyor at the planned visual recognition position. Even when evaluation of visual recognizability of the information conveyor displayed at the planned visual recognition position indicates that the driver will be hardly capable of visually recognizing the information conveyor displayed at the planned visual recognition position, however, the information conveyor is once displayed at the planned visual recognition position and, after that, the planned visual recognition position is changed to a new position at which the information conveyor is displayed. By once displaying the information conveyor at the original visual recognition position, the driver can enjoy an effect of an ability to grasp the visual recognition position with ease in the case of an information conveyor exhibiting a positional characteristic. An example of the information conveyor having a positional characteristic is an information conveyor showing a spot requiring cautions. Examples of the spot requiring cautions are a railroad crossing, the location of an out-of-order vehicle and the location of a falling object. It is to be noted that, even after the original visual recognition position is changed to a new position, some indicators such as a drawing line can be used to show the original display position.

(d) The control unit 110 implemented by the embodiment described above is a control unit of a head-up display type of a projection system. However, a control unit 110 of a self-light system or a head-mount display type also works and provides the same effects.

(e) The display process of the embodiment described above is carried out repeatedly as long as the ignition key of the vehicle is in an ON state and information to be displayed exists. Thus, a method of displaying the information conveyor can be changed in a real-time manner naturally in accordance with the condition external to this vehicle.

When an interrupting vehicle enters a road in front of this vehicle while an information conveyor is being displayed, for example, the visual recognition position of the information conveyor is changed. When the interrupting vehicle disappears, the visual recognition position of the information conveyor is changed again.

What is claimed is:

1. A display method adopted in a vehicle for allowing a driver of a vehicle to three-dimensionally recognize an information conveyor for conveying information to the driver by utilizing a difference in vision between eyes of the driver, the method comprising:

determining a position of existence of the information conveyor;

determining whether an object exists between the determined position of existence of the information conveyor and the vehicle such that the information conveyor is substantially hidden by the object and substantially invisible from the vehicle;

changing the determined position of existence of the information conveyor, when the object is determined to exist between the determined position of existence of the information conveyor and the vehicle, to a position other than a location behind the object in advance of displaying; and displaying the information conveyor at the changed position in a display of the vehicle.

2. The display method as in claim 1, further comprising the step of:

changing the determined position of the information conveyor, when a color tone distribution degree of a background at the determined position of existence of the information conveyor is higher than a predetermined reference, to a position having a color tone distribution degree lower than the predetermined reference in advance of the displaying step.

3. The display method as in claim 1, further comprising the step of:

displaying the information conveyor once at the determined position of existence before being changed by the changing step.

4. The display method as in claim 1, further comprising the step of:

changing a display color of the information conveyor in accordance with a color of a background at the determined position of existence of the information conveyor.

5. The display method as in claim 1, wherein the changing of the determined position of existence of the information conveyor further comprises changing the position only when the determined position is within a display image of the object in the display.

6. The display method as in claim 1, wherein the displaying of the information conveyor further comprises displaying the information conveyor such that the information conveyor is viewed as locating the object and the vehicle.

* * * * *